United States Patent [19]

Melo

[11] Patent Number: 4,936,408

[45] Date of Patent: Jun. 26, 1990

[54] APPARATUS FOR PREVENTING THEFT OF AN AUTOMOTIVE VEHICLE

[76] Inventor: Frank L. Melo, 818 Hemlock Rd., Union, N.J. 07083

[21] Appl. No.: 320,329

[22] Filed: Mar. 8, 1989

[51] Int. Cl.[5] .............................................. B60R 25/02
[52] U.S. Cl. ...................................... 180/287; 70/252
[58] Field of Search ................. 70/252, 186; 180/271, 180/287

[56] References Cited

U.S. PATENT DOCUMENTS

| | | | |
|---|---|---|---|
| 4,167,222 | 9/1979 | El Bindari | 180/287 |
| 4,258,560 | 3/1981 | Jessop | 180/287 |
| 4,438,421 | 3/1984 | Adkins | 180/287 |
| 4,712,639 | 12/1987 | Solow | 180/287 |

*Primary Examiner*—Richard A. Bertsch
*Attorney, Agent, or Firm*—Klauber & Jackson

[57] ABSTRACT

Apparatus for preventing theft of an automobile having a rotatable steering shaft for steering the vehicle and an ignition mounted at a fixed position, includes three equiangularly disposed holes extending transversely through the steering shaft; a steering shaft locking pin movable between a locking position in any hole and an unlocking position out of the holes; and ignition shaft engageable with the steering shaft locking pin for moving the latter into and out of the holes; a dead bolt locking pin engaged by the ignition; a spring which moves the dead bolt locking pin into blocking relation to the steering shaft locking pin to prevent removal thereof from a hole in the steering shaft when the ignition is removed from its fixed position; the upper end of the dead bolt locking pin extending through a first slot in a steering wheel locking plate positioned about the steering shaft and engaging a horn spring to actuate a horn; a plate locking pin engaged by the ignition shaft and movable into a second slot in the steering wheel locking plate when the ignition is turned off; a wire spring connecting the ignition shaft to the plate locking pin; a spring guide rod engaged with the wire spring to prevent removal thereof; and an ignition gear mounted on the ignition shaft and including a projection positioned beneath the plate locking pin when the latter is in its locking position within the second slot of the steering wheel locking plate.

30 Claims, 8 Drawing Sheets

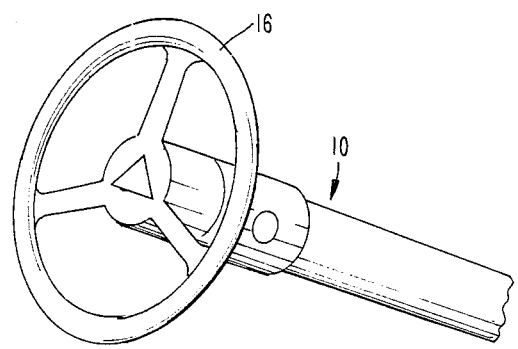
FIG. I
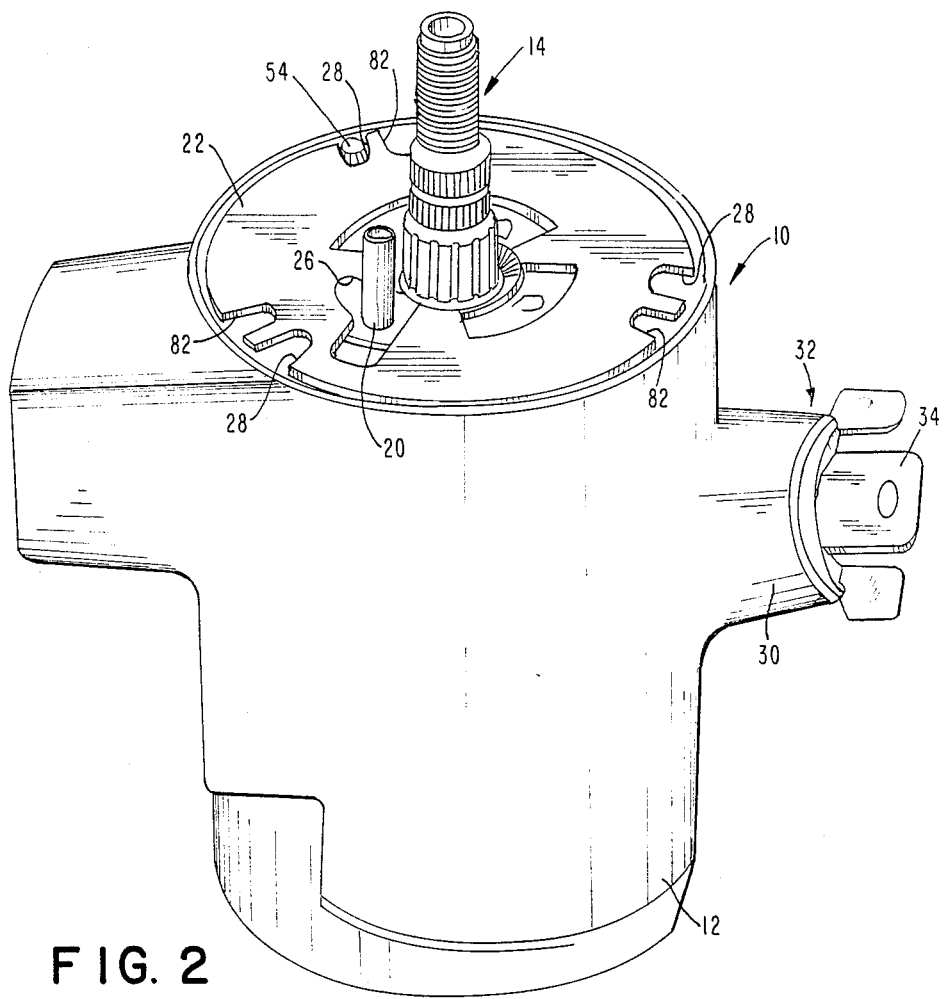
FIG. 2

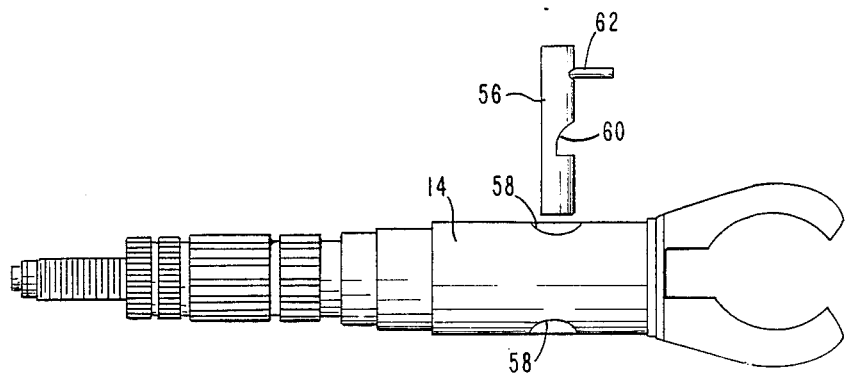
F I G. 12
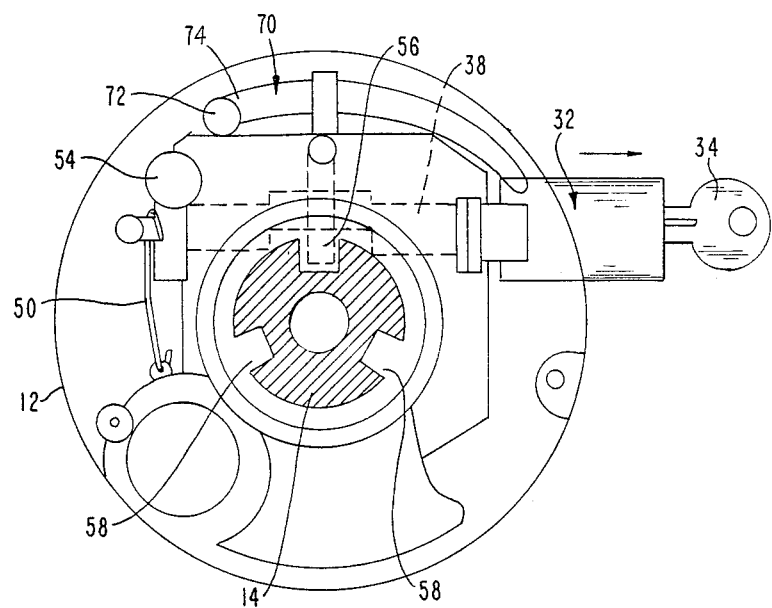
F I G. 13

APPARATUS FOR PREVENTING THEFT OF AN AUTOMOTIVE VEHICLE

BACKGROUND OF THE INVENTION

This invention relates generally to apparatus for preventing theft of an automotive vehicle and, more particularly, is directed to a mechanical device which prevents a thief from steering the vehicle after break-in and starting of the engine.

In order to prevent theft of an automobile, conventional steering wheel columns provide a spring which biases a locking pin into a slot in a steering wheel locking plate in the column. The locking pin is biased against the spring and out of engagement with the steering wheel locking plate in response to turning on of the ignition. Thus, when the automobile is parked and the ignition is off, although the thief can start the automobile by "hot-wiring" the same, the steering wheel cannot be rotated since the locking pin is biased into the slot in the steering wheel locking plate. In other words, only when the key is placed in the ignition and the ignition is turned on, will the locking pin be removed from the slot in the steering wheel locking plate.

However, when a thief goes to steal an automobile, he generally breaks the outer casing of the steering column at the left side thereof and removes the spring. This, in turn, causes the locking pin to drop down out of the slot in the steering wheel locking plate and thereby free the steering wheel for movement. Then, the automobile can be driven.

Other devices have been suggested for preventing theft of an automobile. For example, U.S. Pat. No. 1,168,701 to Babbitt discloses a locking bolt which can be moved into a recess in the steering shaft. When the ignition key is turned to park the car, the inner shaft or locking cylinder of the ignition is removed from a recess in the locking bolt so that a spring biases the locking bolt into a recess in the steering shaft so as to prevent rotation of the same. With this device, however, it is only necessary for the thief to remove the ignition from the steering column, and insert a tool therein to bias the locking bolt against the spring to free the steering shaft for rotation. Generally, removal of the ignition is a relatively minor matter which can be performed in a short period of time.

U.S. Pat. No. 4,759,203 to Lieb et al. discloses a steering and ignition lock for an automobile in which a latch bolt is moved by the inner shaft of the ignition into a recess of the steering column of the automobile. As with Babbitt, a spring normally biases a control body attached to the latch bolt so as to bias the latch bolt into the recess of the steering column. Thus, with respect to locking of the steering column, this patent is identical in its relevant aspects to Babbitt.

U.S. Pat. No. 4,658,610 to Weber discloses a cylinder lock which is similar in relevant aspects to Babbitt. Specifically, two bolts which are controlled by the inner shaft of the ignition are biased by springs into engagement with gear teeth on a bushing which is non-rotatably disposed on the steering shaft. Therefore, as with Babbitt, a thief can easily, after removing the ignition, merely bias the locking bolts against the springs so as to permit rotation of the steering shaft.

U.S. Pat. No. 2,155,064 to Sandberg; U.S. Pat. No. 3,723,682 to Pecott; and U.S. Pat. No. 4,232,537 to Plaiss disclose other known arrangements which are even more remote than the aforementioned patents.

OBJECTS AND SUMMARY OF THE INVENTION

Accordingly, it is an object of the present invention to provide apparatus for preventing theft of an automotive vehicle.

It is another object of the present invention to provide such an apparatus in which a steering shaft locking pin is inserted in a transverse hole extending in the steering shaft when the ignition is turned off to prevent steering of the vehicle.

It is still another object of the present invention to provide such an apparatus in which a dead bolt locking pin is biased into blocking relation to the steering shaft locking pin to prevent disengagement of the steering shaft locking pin from the steering shaft when the ignition is removed form the vehicle.

It is yet another object of the present invention to provide such an apparatus in which the dead bolt locking pin simultaneously engages within a slot in the steering wheel locking plate to provide a further safeguard against rotation of the steering shaft.

It is a further object of the present invention to provide such an apparatus in which the upper end of the dead bolt locking pin hits a horn spring to activate the horn of the car when biased into the slot of the steering wheel locking plate.

It is a still further object of the present invention to provide such an apparatus in which the ignition gear connected with the inner shaft of the ignition switch is provided with a projection which is positioned beneath the plate locking pin to prevent the same from falling out of the slot in the steering wheel locking plate even when the wire spring holding the same therein is removed.

It is a yet further object of the present invention to provide a spring rod engaged with the wire spring for the plate locking pin to prevent removal of such spring by a thief.

It is another object of the present invention to provide such an apparatus in which the key cannot be removed from the ignition switch unless the steering wheel is in one of three positions.

In accordance with an aspect of the present invention, apparatus for preventing theft of an automotive vehicle of the type having a rotatable steering shaft for steering the vehicle and an ignition mounted at a fixed position in the vehicle, includes locking means engageable with the steering shaft for preventing rotation of the steering shaft; means for moving the locking means between a locking position in engagement with the steering shaft to prevent rotation of the steering shaft and an unlocking position out of engagement with the steering shaft to permit rotation of the steering shaft; and blocking means, movable into blocking relation to the locking means when the ignition is removed from the fixed position, for preventing disengagement of the locking means from the steering shaft.

In accordance with another aspect of the present invention, apparatus for preventing theft of an automotive vehicle of the type having a rotatable steering shaft for steering the vehicle and an ignition mounted at a fixed position in the vehicle, includes a hole extending transversely through the steering shaft; a steering shaft locking pin movable between a locking position in the hole and an unlocking position out of the hole; means for moving the locking pin between the locking and unlocking positions; a dead bolt locking pin held in a first position by the ignition; and biasing means for biasing the dead bolt locking pin into blocking relation to the steering shaft locking pin so as to prevent removal of the steering shaft locking pin from the hole when the ignition is removed from the fixed position.

The above and other objects, features and advantages of the present invention will become apparent from the following detailed description thereof which is to be read in connection with the accompanying drawings.

BRIEF DESCRIPTION OF THE DRAWINGS

FIG. 1 is a perspective view of a steering column and steering wheel according to the present invention;

FIG. 2 is a perspective view of a portion of the steering column according to the present invention;

FIG. 12 is a side elevational view of the steering shaft and steering shaft locking pin according to the present invention;

FIG. 13 is a schematic, horizontal cross-sectional view of the steering column of FIG. 2;

DETAILED DESCRIPTION OF A PREFERRED EMBODIMENT

Figure 3:
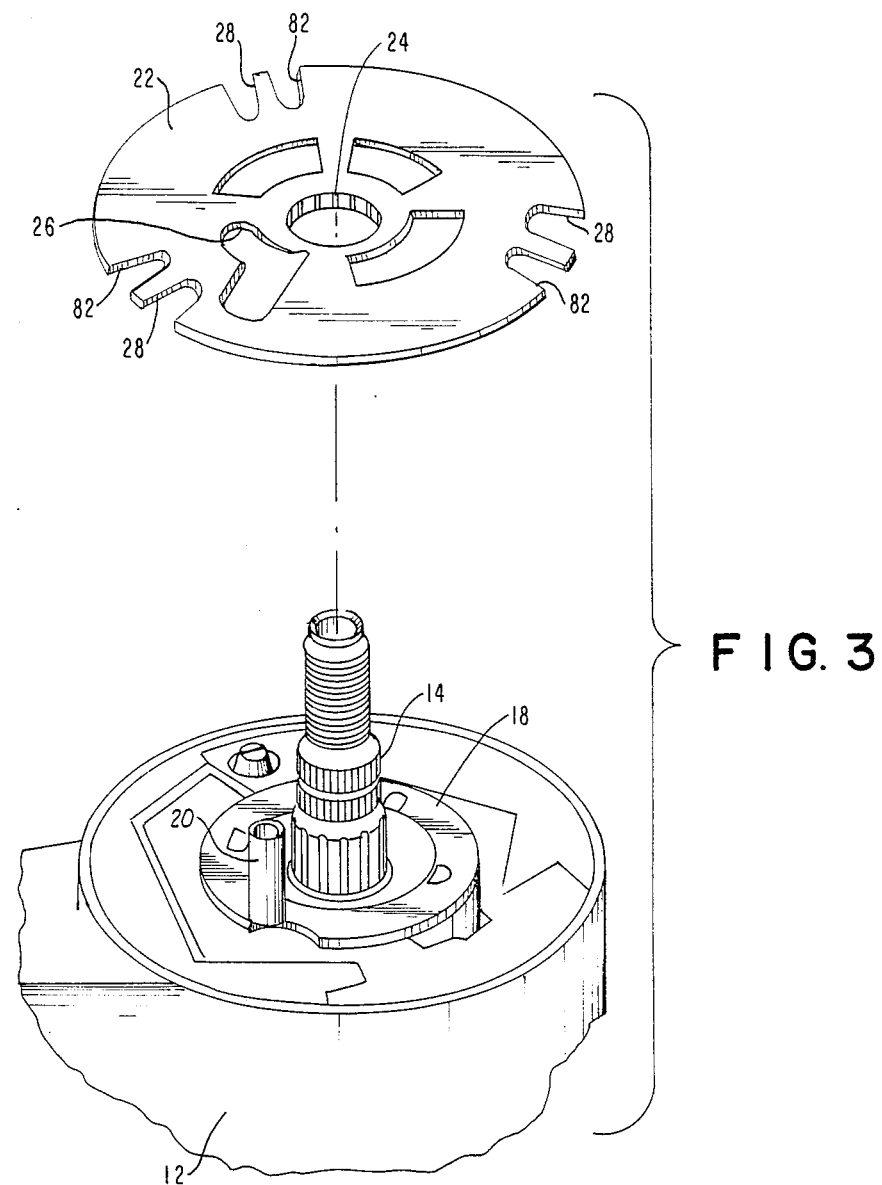
FIG. 3 is a perspective, partially exploded, view of the steering column of FIG. 2.

Referring to the drawings in detail, and initially to FIG. 1 thereof, commercially sold automobiles are provided with a steering column 10 with an outer casing 12 and a steering shaft 14 rotatably mounted within outer casing 12. A steering wheel 16 is connected to the upper end of steering shaft 14 for controlling rotation of steering shaft 14, and thereby steering the automobile, as is conventional.

As shown in FIGS. 2 and 3, an annular plate 18 is fixed to steering shaft 14 at the upper open end of outer casing 12 for rotation with steering shaft 14. Annular plate 18 includes an upwardly extending post 20 at an outer peripheral position thereof. A steering wheel locking plate 22 is positioned on top of annular plate 18 and includes a central aperture 24 which rotatably receives the upper end of steering shaft 14. Steering wheel locking plate 22 includes an inner annularly oriented slot 26 through which post 20 extends for rotatable movement therein. Thus, as steering shaft 14 is rotated, annular plate 18 and post 20 rotate therewith, with post 20 being movable over a small angular extent within slot 26. When the steering wheel 16 is rotated to a greater extent, post 20 abuts against a respective edge of slot 26 to, in turn, cause rotation of steering wheel locking plate 22. Steering wheel locking plate 22 further includes, as is conventional, three equiangularly disposed slots 28 at the outer periphery thereof.

Figure 6:
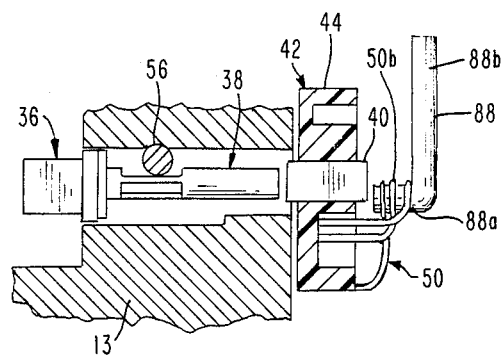
FIG. 6 is a cross-sectional view of a portion of the steering column of FIG. 1, showing the interaction of the ignition shaft with the steering shaft locking pin.
Figure 7:
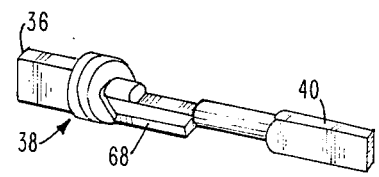
FIG. 7 is a perspective view of the ignition shaft of FIG. 6.
Figure 8:
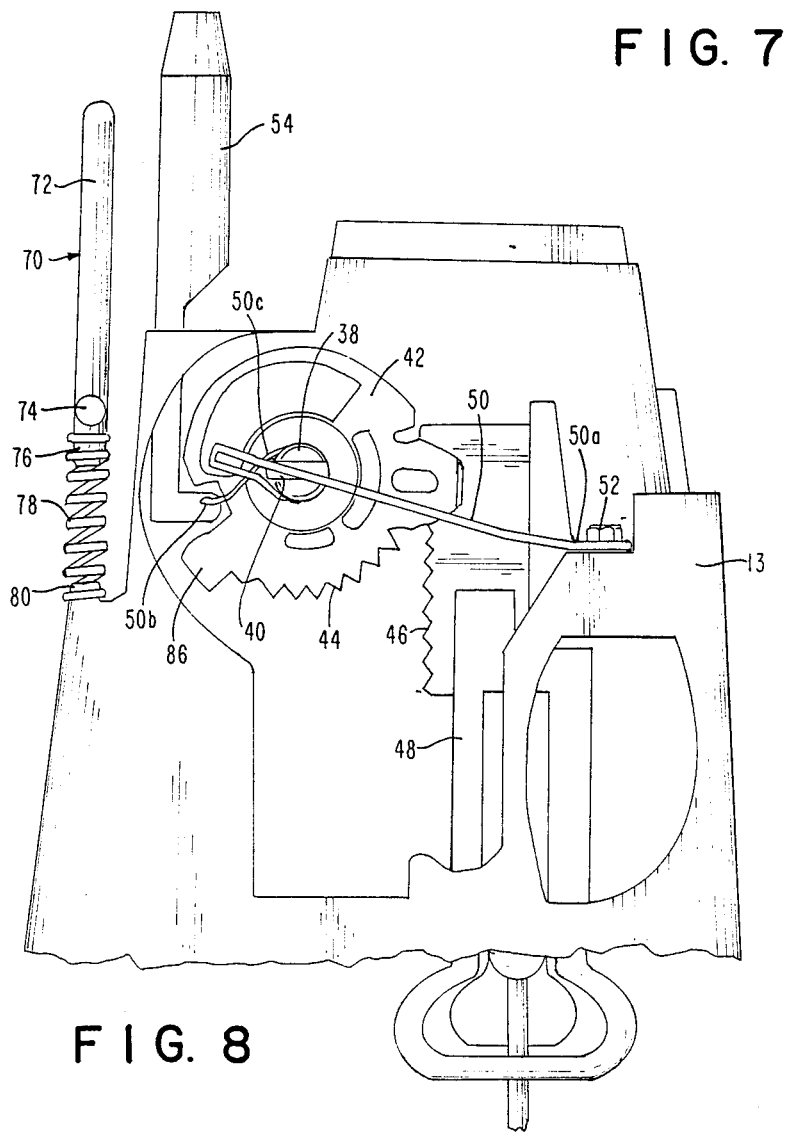
FIG. 8 is a broken-away, side elevational view of a portion of the steering column of FIG. 2, showing the ignition in an on position and the plate locking pin in an upward position for engaging the steering wheel locking plate.
Figure 10:
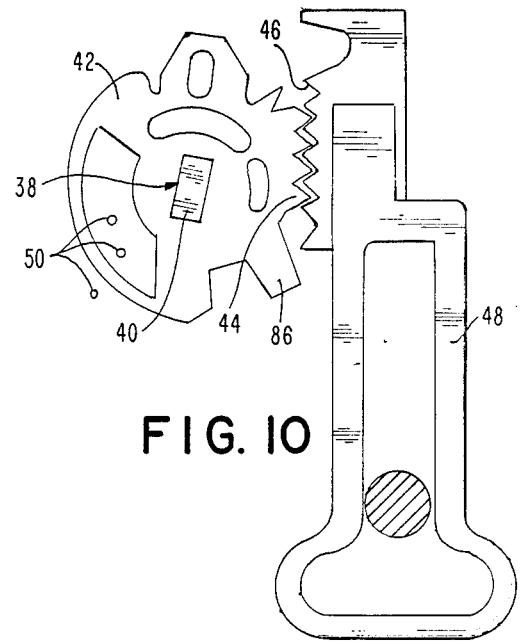
FIG. 10 is a side elevational view, showing the ignition gear in meshing engagement with the ignition rod.
Figure 11:
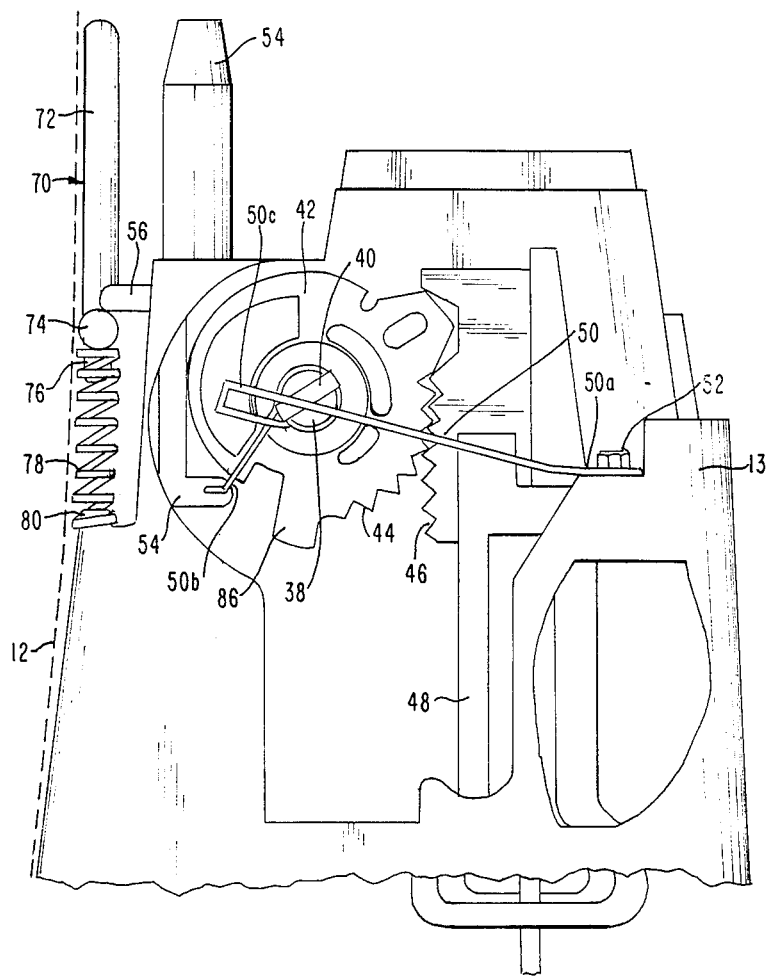
FIG. 11 is a broken-away, side elevational view of the portion of the steering column of FIG. 8, with the ignition in an off position and the plate locking pin in a disengaged position.

As shown in FIG. 2, outer casing 12 includes an ignition casing 30 integrally formed therewith at one side thereof for receiving the ignition 32 for starting the automobile. As is conventional, ignition 32 is adapted to receive a key 34 for starting the automobile. Specifically, key 34 is adapted to engage, through suitable coupling (not shown), one end 36 of an ignition shaft 38 which extends through ignition casing 30, as shown in FIGS. 6 and 7. As shown in FIGS. 8, 10 and 11, the opposite end 40 of ignition shaft 38 has a gear 42 mounted thereon with gear teeth 44 which are in meshing engagement with gear teeth 46 of an ignition rod 48 which is connected through suitable coupling (not shown), as is conventional, to a starter motor. Thus, when key 34 is turned in the clockwise direction, gear 42 is caused to rotate, thereby vertically moving ignition rod 48 through the aforementioned meshing engagement of gear teeth 44 and 46 so as to actuate the starter motor to start the automobile.

Figure 9:
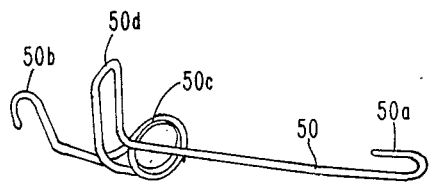
FIG. 9 is a perspective view of the wire spring for moving the plate locking pin according to the present invention.

In addition, a wire spring 50, as shown in FIGS. 8, 9, and 11 has one end 50a thereof secured by a bolt 52 to an inner casing 13 and the opposite end 50b thereof connected to the lower end of a vertically movable plate locking pin 54. An intermediate portion 50c, adjacent end 50b, is connected with end 40 of ignition shaft 38 extending from ignition gear 42. When the automobile is stopped, such that key 34 is removed from ignition 32, ignition shaft 38 causes wire spring 50 to move plate locking pin 54 to the vertically upward position shown in FIG. 8. In such position, when steering wheel 16 is rotated to one of three predetermined positions, the upper end of plate locking pin 54 extends through a respective slot 28 in steering wheel locking plate 22, thereby providing only limited rotation of steering shaft 14, determined by the small angular movement of post 20 within slot 26. In effect, this prevents the automobile from being steered so as to prevent theft thereof even if the automobile is "hot-wired" or the like so as to be started.

It will be appreciated that key 34 can only be removed when plate locking pin 54 is in a slot 28. Thus, when turning key 34 to shut off the automobile, plate locking pin 54 will generally hit the underside of steering wheel locking plate 22, so that key 34 cannot be turned completely, and cannot be removed. Upon rotation of steering wheel 16, plate locking pin 54 will fall into a slot 28, to permit key 34 to be completely turned and removed.

When key 34 is inserted in ignition 32 and turned so as to start the automobile, ignition shaft 38 is rotated, causing wire spring 50 to move plate locking pin 54 to the lower position shown in FIG. 11. In such position, the upper end of plate locking 54 is out of engagement with slot 28 so as to permit rotation of steering wheel locking plate 22, and thereby permit rotation of steering shaft 14. Thus, plate locking pin 54 and steering wheel locking plate 22 function as an anti-theft device to prevent steering of the automobile by a thief.

However, when a thief attempts to steal the automobile, he generally breaks the outer casing 12 and removes wire spring 50. This, in turn, causes plate locking pin 54 to drop out of the respective slot 28 and thereby free steering shaft 14 for rotational movement. Generally, the hot-wiring of an automobile and removal of wire spring 50 occurs within an approximately 30 second time period.

Figure 14:
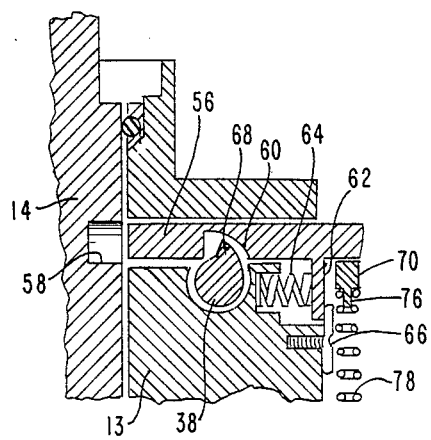
FIG. 14 is a cross-sectional view of a portion of the steering column of FIG. 13, showing the interaction of the steering shaft locking pin, ignition shaft and dead bolt locking pin in an unlocking position.
Figure 15:
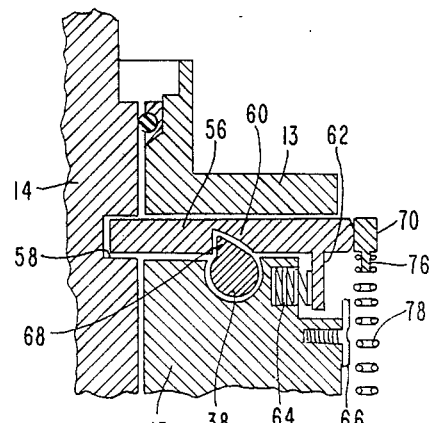
FIG. 15 is a cross-sectional view of the portion of the steering column of FIG. 14, showing the steering shaft locking pin engaged with the steering shaft and the dead bolt locking pin in blocking relation to the steering shaft locking pin.
Figure 18:
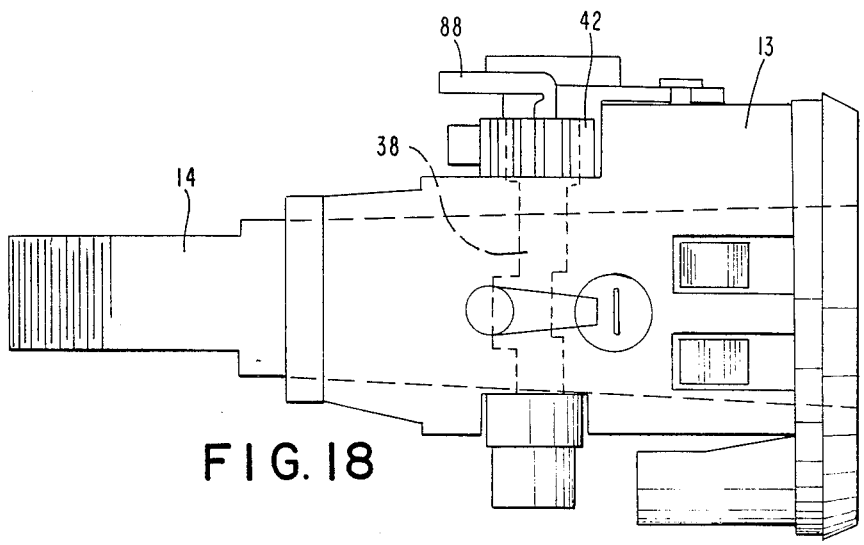
FIG. 18 is a side elevational view of a portion of the steering column of FIG. 2.

The present invention provides an improvement over such conventional arrangement. Specifically, a steering shaft locking pin 56, as shown in FIGS. 12 and 13, is radially movable into and out of any of three notches 58 in steering shaft 14 to prevent rotation of steering shaft 14. Notches 58 are equiangularly arranged in the outer periphery of steering shaft 14 at an identical axial position therealong. As shown best in FIGS. 12, 14 and 15, steering shaft locking pin 56 is provided with a crescent-shaped notch 60 at its underside and has a spring stop 62 extending radially outward at the outer end thereof. A coil spring 64 positioned between inner casing 13 and spring stop 62 normally biases steering shaft locking pin 56 in a direction out of engagement with the respective notch 58. The primary purpose of coil spring 64 is to take up any free play between the cam (described hereinafter) of ignition shaft 38 and steering shaft locking pin 56. Such outward movement by steering shaft locking pin 56 is limited by a bolt 66 received in inner casing 13 and the head of which limits movement of spring stop 62, as shown in FIG. 14. As will be described hereinafter, ignition shaft 38 moves steering shaft locking pin 56 into a respective recess 58, as shown in FIG. 15, when key 34 is moved to the off position of the automobile. In this regard, ignition shaft 38 includes a cam 68 which fits within crescent-shaped notch 60 of steering shaft locking pin 56 so that when ignition shaft 38 is moved to the off position, cam 68 moves steering shaft locking pin 56 to the locking position shown in FIG. 15. It will be appreciated that notches 58 are arranged in correspondence with slots 28 so that steering shaft locking pin 56 will engage within a notch 58 only when plate locking pin 54 engages within a slot 28.

On the other hand, when the automobile is started and ignition shaft 38 is rotated in the clockwise direction of FIGS. 14 and 15, cam 68, in conjunction with spring 64, moves steering shaft locking pin 56 to the position shown in FIG. 14 out of engagement with the respective notch 58 in steering shaft 14. This arrangement, by itself, however, is insufficient to prevent theft of an automobile since it is somewhat similar to U.S. Pat. Nos. 1,168,701; 4,658,610; and 4,759,203, which were previously described. In other words, a thief can still remove ignition 32, including ignition shaft 38, whereby spring 64 would move steering shaft locking pin 56 out of engagement with the respective notch 58.

Figure 16:
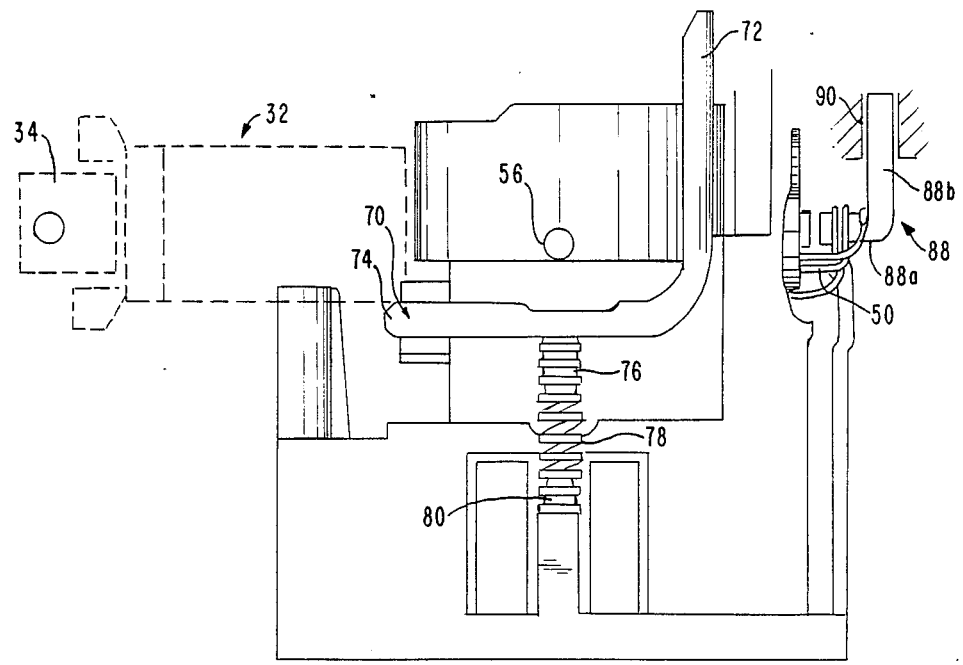
FIG. 16 is a side elevational view of a portion of the steering column of FIG. 2, showing the dead bolt locking pin in non-blocking relation to the steering shaft locking pin.
Figure 17:
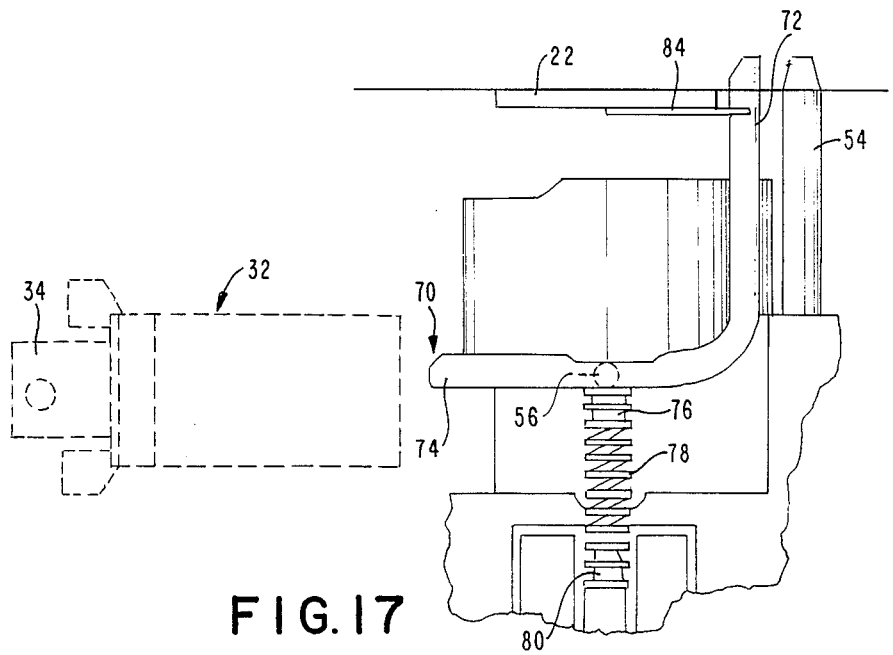
FIG. 17 is a side elevational view of the portion of the steering column of FIG. 16, showing the dead bolt locking pin in blocking relation to the steering shaft locking pin.

In accordance with the present invention, a dead bolt locking pin 70, as best shown in FIGS. 8, 11, 13, 16 and 17, is formed in an L-shape having a vertical arm 72 and a horizontal arm 74, with a spring post 76 extending downwardly from the approximate center of horizontal arm 74. Dead bolt locking pin 70 is mounted radially outward of steering shaft locking pin 56, and as shown in FIGS. 16 and 17, preferably such that spring post 76 is in vertical alignment with steering shaft locking pin 56. Specifically, dead bolt locking pin 70 is mounted such that spring post 76 engages an upper end of a coil spring 78, the lower end of coil spring 78 resting on a spring support post 80 of inner casing 13. Further, as shown in FIGS. 13 and 16, the free end of horizontal arm 74 is restrained in its upward movement by ignition 32. Thus, coil spring 78 normally biases dead bolt locking pin 70 upwardly such that the free end of horizontal arm 74 abuts against ignition 32. It will be appreciated that outer casing 12, shown by dashed lines in FIG. 11, is adjacent dead bolt locking pin 70 so as to hold the same in position.

In the position shown in FIGS. 11, 13 and 16, when ignition 32 is within ignition casing 30, horizontal arm 74 is positioned below steering shaft locking pin 56 so as to permit movement of steering pin locking shaft 56 out of a respective notch 58 to the position shown in FIG. 14. On the other hand, when ignition 32 is removed by a thief, dead bolt locking pin 70 is no longer restrained thereby, such that spring 78 biases dead bolt locking pin 70 upwardly wherein horizontal arm 74 is in blocking relation to steering shaft locking pin 56, as shown in FIGS. 15 and 17, to prevent removal of steering shaft locking pin 56 from the respective notch 58.

Figure 4:
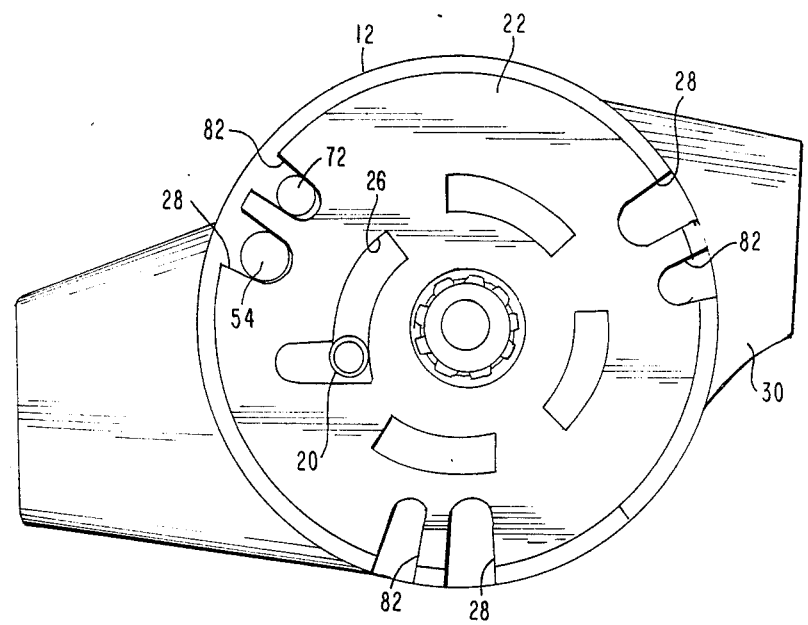
FIG. 4 is a top plan view of the steering column of FIG. 2.

At the same time, vertical arm 72 of dead bolt locking pin 70 is moved vertically upward into engagement with one of three equiangularly spaced slots 82 at the outer periphery of steering wheel locking plate 22, as shown in FIG. 4.

In basic operation, when a thief attempts to steal an automobile and breaks into outer casing 12 of steering column 10 so as to remove wire spring 50, thereby providing that plate locking pin 54 will fall out of a respective slot 28, the thief still cannot steer the vehicle. This is because, when the automobile is turned off, steering shaft locking pin 56 is positioned within a respective notch 58 in steering shaft 14 so that the steering wheel 16 can still not be turned. However, the thief cannot see this securement. Therefore, the thief believes there is something wrong and attempts to steal the automobile by removing ignition 32. At such time, dead bolt locking pin 70 is no longer restrained by ignition 32 such that coil spring 78 biases dead bolt locking pin 70 upwardly in blocking relation to steering shaft locking pin 56. Accordingly, even if ignition 32 is removed, thereby exposing ignition shaft 38 and/or steering shaft locking pin 56, ignition shaft 38 can still not be rotated to the starting position. This is because steering shaft locking pin 56 is maintained within a respective notch 58, as shown in FIG. 15, such that ignition shaft 38 cannot be rotated. Specifically, this is because cam 68 is engaged within crescent-shaped notch 60 of steering shaft locking pin 56, and steering shaft locking pin 56 is prevented from moving out of notch 58 of steering shaft 14 because it is now blocked by dead bolt locking pin 70. Therefore, even if the thief can "hot-wire" the automobile, he cannot steer the automobile at this time, and there is no way for the thief to release the steering shaft 14 from its locked position unless the entire steering assembly is taken apart, which takes considerable time.

At the same time, when coil spring 78 moves dead bolt locking pin 70 upwardly, the upper end of vertical arm 72 engages within a respective slot 82 to provide a further restriction on movement of steering wheel locking plate 22, and thereby of steering shaft 15.

Figure 5:
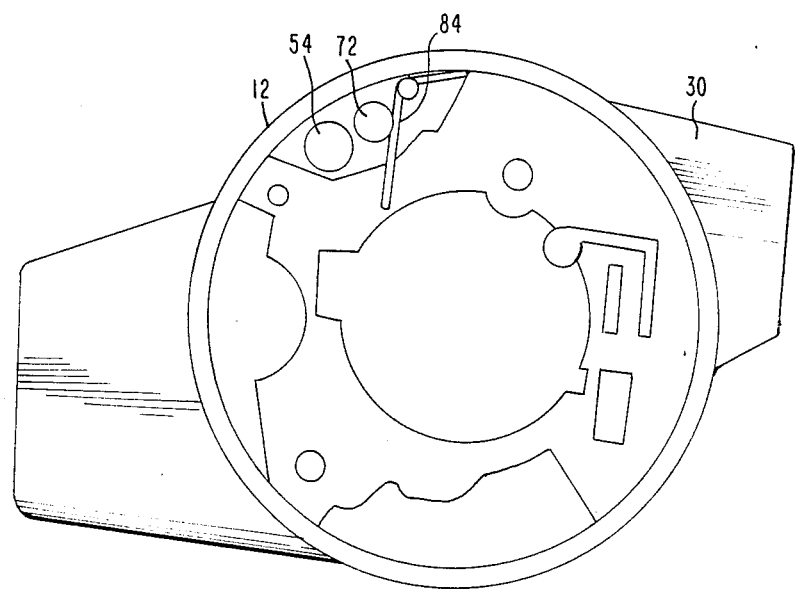
FIG. 5 is a top plan view of the outer casing of the steering column of FIG. 4.

In accordance with another aspect of the present invention, when vertical arm 72 of dead bolt locking pin 70 extends through a respective slot 82, it makes electrical contact with a horn spring 84, as best shown in FIGS. 5 and 17. This electrical connection closes a circuit and actuates the horn (not shown) of the automobile. The only way that the horn can be shut off at this time is to take apart the entire steering column or to remove the battery cables from the battery. Of course, this would be too time-consuming for a thief. In this regard, it will be appreciated that steering wheel locking plate 22 is prevented from movement by vertical arm 72 of dead bolt locking pin 70 so as to prevent rotation of steering shaft 14. In addition, horizontal arm 74 of deadbolt locking pin 70 blocks removal of steering shaft locking pin 56 from the respective notch 58 in steering shaft 14 so as to further prevent rotation of steering shaft 14. At the same time, the horn is actuated so as to scare away the thief. Of course, it will be appreciated that the entire assembly must be reset by a mechanic over a considerable period of time. However, the cost for such resetting of the steering wheel column mechanism, and primarily dead bolt locking pin 70, is much less than the cost of a stolen automobile.

As a further safeguard, ignition gear 42 is provided with an enlarged tooth 86. When plate locking pin 54 is moved to its upward position into a respective slot 28, enlarged tooth 86 is positioned below the lower end of plate locking pin 54. Therefore, even if wire spring 50 is removed by the thief, plate locking pin 54 remains within a respective slot 28 of steering wheel locking plate 22, supported by enlarged tooth 86. In this regard, rotation of steering shaft 14 is prevented in three ways, namely, steering shaft locking pin 56 positioned in locking relation within a respective notch 58, plate locking pin 54 positioned within a respective notch 28 of steering wheel locking plate 22, and vertical arm 72 of dead bolt locking pin 70 positioned within a respective slot 82 of steering wheel locking plate 22.

Referring to FIGS. 6 and 16, and as a still further safeguard to prevent theft of the automobile, wire spring 50 includes a looped portion 50d adjacent intermediate portion 50c and through which the horizontal arm 88a of a spring guide rod 88 is inserted. The vertical arm 88b of spring guide rod 88 fits within a bore 90 of casing 12. In this regard, wire spring 50 cannot be removed unless it is cut by the thief, which further delays the thief and inhibits theft of the automobile. This is particularly so because the thief needs to enter, start and leave with the automobile within an approximately three minute time period before being detected. He cannot do this while steering wheel 16 is locked and the horn is actuated.

Having described a specific preferred embodiment of the invention with reference to the accompanying drawings, it will be appreciated that the present invention is not limited to this precise embodiment, and that various changes and modifications can be effected therein by one of ordinary skill in the art without departing from the spirit or scope of the invention as defined by the appended claims.

What is claimed is:

1. Apparatus for preventing theft of an automotive vehicle of the type having a rotatable steering shaft for steering the vehicle and an ignition mounted at a fixed position in said vehicle, said apparatus comprising:

locking means engageable with said steering shaft for preventing rotation of said steering shaft;

means for moving said locking means in a radial direction of said steering shaft between a locking position in engagement with said steering shaft to prevent rotation of said steering shaft and an unlocking position out of engagement with said steering shaft to permit rotation of said steering shaft; and blocking means, movable into blocking relation to the locking means when said ignition is removed from said fixed position, for preventing disengagement of said locking means from said steering shaft.

2. Apparatus according to claim 1; wherein said locking means includes three holes, each extending transversely through said steering shaft and each equiangularly displaced with respect to each other, and a steering shaft locking pin movable between a locking position in any of said holes and an unlocking position out of said holes.

3. Apparatus according to claim 1; wherein said locking means includes a hole extending transversely through said steering shaft and a steering shaft locking pin movable between a locking position in said hole and an unlocking position out of said hole.

4. Apparatus according to claim 3; wherein said means for moving includes an ignition shaft engaged with said steering shaft locking pin for moving said steering shaft locking pin into said hole.

5. Apparatus according to claim 4; further comprising biasing means for biasing said steering shaft locking pin away from said hole in the absence of an external force thereagainst.

6. Apparatus for preventing theft of an automotive vehicle of the type having a rotatable steering shaft for steering the vehicle and an ignition mounted at a fixed position in said vehicle, said apparatus comprising:

locking means engageable with said steering shaft for preventing rotation of said steering shaft, said locking means including a hole extending transversely through said steering shaft and a steering shaft locking pin movable between a locking position in said hole and an unlocking position out of said hole;

means for moving said locking means between a locking position in engagement with said steering shaft to prevent rotation of said steering shaft and an unlocking position out of engagement with said steering shaft to permit rotation of said steering shaft; and blocking means, movable into blocking relation to the locking means when said ignition is removed from said fixed position, for preventing disengagement of said locking means from said steering shaft, said blocking means including a dead bolt locking pin movable behind said steering shaft locking pin to prevent said steering shaft locking pin from disengaging from said hole, when said ignition is removed from said fixed position.

7. Apparatus according to claim 6; wherein said blocking means includes biasing means for biasing said blocking means into said blocking relation when said ignition is removed from said fixed position.

8. Apparatus according to claim 6; further comprising a steering wheel locking plate coupled to said ignition shaft for rotation therewith, said steering wheel locking plate including at least one slot therein; and said dead bolt locking pin has an end which engages within at least one said slot of said steering wheel locking plate when said ignition is removed from said fixed position to prevent steering of said vehicle.

9. Apparatus according to Claim 8; further including a horn spring engaged by said dead bolt locking pin when the latter is engaged within at least one said slot so as to actuate a horn of said vehicle.

10. Apparatus for preventing theft of an automotive vehicle of the type having a rotatable steering shaft for steering the vehicle and an ignition mounted at a fixed position in said vehicle, said apparatus comprising:
   locking means engageable with said steering shaft for preventing rotation of said steering shaft;
   means for moving said locking means between a locking position in engagement with said steering shaft to prevent rotation of said steering shaft and an unlocking position out of engagement with said steering shaft to permit rotation of said steering shaft, said means for moving including an ignition shaft;
   blocking means, movable into blocking relation to the locking means when said ignition is removed from said fixed position, for preventing disengagement of said locking means from said steering shaft;
   a steering wheel locking plate coupled to said steering shaft for rotation therewith and having at least one slot therein; and
   a plate locking pin movable by said ignition shaft between a locking position in said at least one slot of said steering wheel locking plate when said locking means is engaged with said steering shaft and an unlocking position out of said at least one slot when said locking means is disengaged with said steering shaft.

11. Apparatus according to claim 10; further comprising means for connecting said plate locking pin and said ignition shaft so as to cause movement of said plate locking pin between said locking and unlocking positions upon rotation of said ignition shaft.

12. Apparatus according to claim 11; wherein said means for connecting includes a wire spring connected to said plate locking pin and said ignition shaft.

13. Apparatus according to claim 12; further comprising spring guide rod means mounted in a casing and engaged with said wire spring for preventing removal of said wire spring.

14. Apparatus according to claim 10; further comprising an ignition gear mounted at one end of said ignition shaft and including a projection for engaging below said plate locking pin when the latter is moved to said locking position so as to prevent removal of said plate locking pin from said at least one slot when said locking means is engaged with said steering shaft.

15. Apparatus for preventing theft of an automotive vehicle of the type having a rotatable steering shaft for steering the vehicle and an ignition mounted at a fixed position in said vehicle, said apparatus comprising:
   a hole extending transversely through said steering shaft;
   a steering shaft locking pin movable between a locking position in said hole and an unlocking position out of said hole;
   means for moving said locking pin between said locking and unlocking positions;
   a dead bolt locking pin held in a first position by said ignition; and
   biasing means for biasing said dead bolt locking pin into blocking relation to said steering shaft locking pin so as to prevent removal of said steering shaft locking pin from said hole when said ignition is removed from said fixed position.

16. Apparatus according to claim 15; wherein said locking means includes three holes, each extending transversely through said steering shaft and each equiangularly displaced with respect to each other, and said steering shaft locking pin is movable between a locking position in any of said holes and an unlocking position out of said holes.

17. Apparatus according to claim 15; wherein said means for moving includes an ignition shaft engaged with said steering shaft locking pin for moving said steering shaft locking pin into said hole.

18. Apparatus according to claim 17; wherein said steering shaft locking pin includes a notch and said ignition shaft includes cam means positioned in said notch for moving said steering shaft locking pin between said locking and unlocking positions.

19. Apparatus according to claim 17; further comprising biasing means for biasing said steering shaft locking pin away from said hole in the absence of an external force thereagainst by said means for moving.

20. Apparatus according to claim 15; wherein said means for moving includes an ignition shaft; and further comprising a steering wheel locking plate mounted on said steering shaft and having at least one slot therein, and a plate locking pin movable by said ignition shaft between a locking position in said at least one slot of said steering wheel locking plate when said steering shaft locking pin is engaged in said hole and an unlocking position out of said at least one slot when said steering shaft locking pin is disengaged from said hole.

21. Apparatus according to claim 20; further comprising means for connecting said plate locking pin and said ignition shaft so as to cause movement of said plate locking pin between said locking and unlocking positions upon rotation of said ignition shaft.

22. Apparatus according to claim 21; wherein said means for connecting includes a wire spring connected to said plate locking pin and said ignition shaft.

23. Apparatus according to claim 22; further comprising spring guide rod means mounted in a casing and engaged with said wire spring for preventing removal of said wire spring.

24. Apparatus according to claim 20; further comprising an ignition gear mounted at one end of said ignition shaft and including a projection for engaging below said plate locking pin when the latter is moved to said locking position so as to prevent removal of said plate locking pin from said at least one slot when said steering shaft locking pin is engaged in a hole of said steering shaft.

25. Apparatus according to claim 15; further comprising a steering wheel locking plate coupled to said ignition shaft for rotation therewith, said steering wheel locking plate including at least one slot therein; and said dead bolt locking pin has an end which engages within at least one said slot of said steering wheel locking plate when said ignition is removed from said fixed position to prevent steering of said vehicle.

26. Apparatus according to claim 25; further including a horn spring engaged by said dead bolt locking pin when the latter is engaged within at least one said slot so as to actuate a horn of said vehicle.

27. Apparatus for preventing theft of an automotive vehicle of the type having a rotatable steering shaft for steering the vehicle and an ignition mounted at a fixed position in said vehicle, said apparatus comprising:
   three holes extending transversely and equiangularly with respect to each other through said steering shaft;
   a steering shaft locking pin movable between the locking position in any of said holes and an unlocking position out of said holes;
   an ignition shaft rotatably connected with said ignition and engaged with said steering shaft locking pin for moving said steering shaft locking pin between said locking and unlocking positions;
   a steering wheel locking plate coupled to said steering shaft for rotation therewith and having at least one first slot therein and at least one second slot therein;
   a plate locking pin movable by said ignition shaft between a locking position in said at least one first slot of said steering wheel locking plate when said steering shaft locking pin is engaged in any of said holes and an unlocking position out of said at least one first slot when said steering shaft locking pin is disengaged from said holes;
   a wire spring connected to said plate locking pin and said ignition shaft for causing movement of said plate locking pin between said locking and unlocking positions upon rotation of said ignition shaft;
   spring guide rod means mounted in a casing and engaged with said wire spring for preventing removal of said wire spring;
   an ignition gear mounted at one end of said ignition shaft and including a projection for engaging below said plate locking pin when the latter is moved to said locking position so as to prevent removal of said plate locking pin from said at least one slot when steering shaft locking pin is engaged in a hole of said steering shaft;
   a dead bolt locking pin held in a first position by said ignition;
   biasing means for biasing said dead bolt locking pin into blocking relation to said steering shaft locking pin so as to prevent removal of said steering shaft locking pin from said holes when said ignition is removed from said fixed position and for simultaneously moving said dead bolt locking pin into said at least one second slot in said steering wheel locking plate; and
   a horn spring engaged by said dead bolt locking pin when the latter is engaged within said at least one second slot so as to actuate a horn of said vehicle.

28. Apparatus for preventing theft of an automotive vehicle of the type having rotatable steering shaft for steering the vehicle, said apparatus comprising:
   an ignition shaft rotatably mounted in a casing;
   a steering wheel locking plate coupled to said steering shaft for rotation therewith and having at least one slot therein;
   a plate locking pin movable by said ignition shaft between a locking position in said at least one slot of said steering wheel locking plate and an unlocking position out of said at least one slot; and
   an ignition gear mounted at one end of said ignition shaft and including a projection for engaging below said plate locking pin when the latter is moved to said locking position so as to prevent removal of said plate locking pin from said at least one slot.

29. Apparatus for preventing theft of an automotive vehicle of the type having a rotatable steering shaft for steering the vehicle, said apparatus comprising:
   an ignition shaft rotatable in a casing;
   a steering wheel locking plate coupled to said steering shaft for rotation therewith and having at least one slot therein;
   a plate locking pin movable by said ignition shaft between a locking position in said at least one slot of said steering wheel locking plate and an unlocking position out of said at least one slot;
   wire spring means connected to said plate locking pin and said ignition shaft for moving said plate locking pin between said locking and unlocking positions in response to rotation of said ignition shaft; and
   spring guide rod means mounted in said casing and engaged with said wire spring means for preventing removal of said wire spring means.

30. Apparatus according to claim 29; wherein said spring guide rod means has an L-shape with one leg extending through a bore in said casing and another leg engaged with said wire spring means.

* * * * *